(12) United States Patent
O'Donnell

(10) Patent No.: US 7,136,036 B2
(45) Date of Patent: Nov. 14, 2006

(54) METHOD AND APPARATUS FOR UNIFORM BRIGHTNESS IN DISPLAYS

(75) Inventor: Eugene Murphy O'Donnell, Fishers, IN (US)

(73) Assignee: Thomson Licensing, Boulogne-Billancourt (FR)

(*) Notice: Subject to any disclaimer, the term of this patent is extended or adjusted under 35 U.S.C. 154(b) by 244 days.

(21) Appl. No.: 10/182,484

(22) PCT Filed: Nov. 29, 2001

(86) PCT No.: PCT/US01/44897

§ 371 (c)(1),
(2), (4) Date: Jul. 30, 2002

(87) PCT Pub. No.: WO02/44797

PCT Pub. Date: Jun. 6, 2002

(65) Prior Publication Data

US 2003/0020724 A1 Jan. 30, 2003

Related U.S. Application Data

(60) Provisional application No. 60/250,259, filed on Nov. 30, 2000.

(51) Int. Cl.
*G09G 3/36* (2006.01)

(52) U.S. Cl. .................................. 345/88; 345/690
(58) Field of Classification Search ................ 345/204, 345/690, 94, 88, 98; 349/33, 34
See application file for complete search history.

(56) References Cited

U.S. PATENT DOCUMENTS

| 5,126,868 | A  | * | 6/1992  | Kizaki et al. ................. 349/76 |
| 5,151,803 | A  |   | 9/1992  | Wakita et al. ................. 359/56 |
| 5,245,450 | A  |   | 9/1993  | Ukai et al. .................... 359/55 |
| 6,115,092 | A  | * | 9/2000  | Greene et al. ................. 349/74 |
| 6,169,590 | B1 | * | 1/2001  | Abileah et al. ............. 349/120 |
| 6,329,971 | B1 |   | 12/2001 | McKnight .................... 345/95 |
| 6,366,065 | B1 |   | 4/2002  | Morita ........................ 323/280 |
| 6,636,322 | B1 | * | 10/2003 | Terashita .................... 356/492 |
| 6,657,061 | B1 | * | 12/2003 | Stowell et al. .............. 546/158 |
| 6,825,887 | B1 | * | 11/2004 | Miller et al. ................. 348/708 |
| 2002/0145602 | A1 | * | 10/2002 | Matsueda ................... 345/213 |

* cited by examiner

*Primary Examiner*—Ricardo Osorio
(74) *Attorney, Agent, or Firm*—Joseph J. Laks; Harvey D. Fried; Christine Johnson

(57) ABSTRACT

An analog display driver comprises a matrix array of flatness correction values used to compensate for variations in liquid crystal gap dimensions and at least a first digital-to-analog converter (DAC), wherein a variable voltage transfer function is applied to the first DAC preferably using a second DAC.

7 Claims, 3 Drawing Sheets

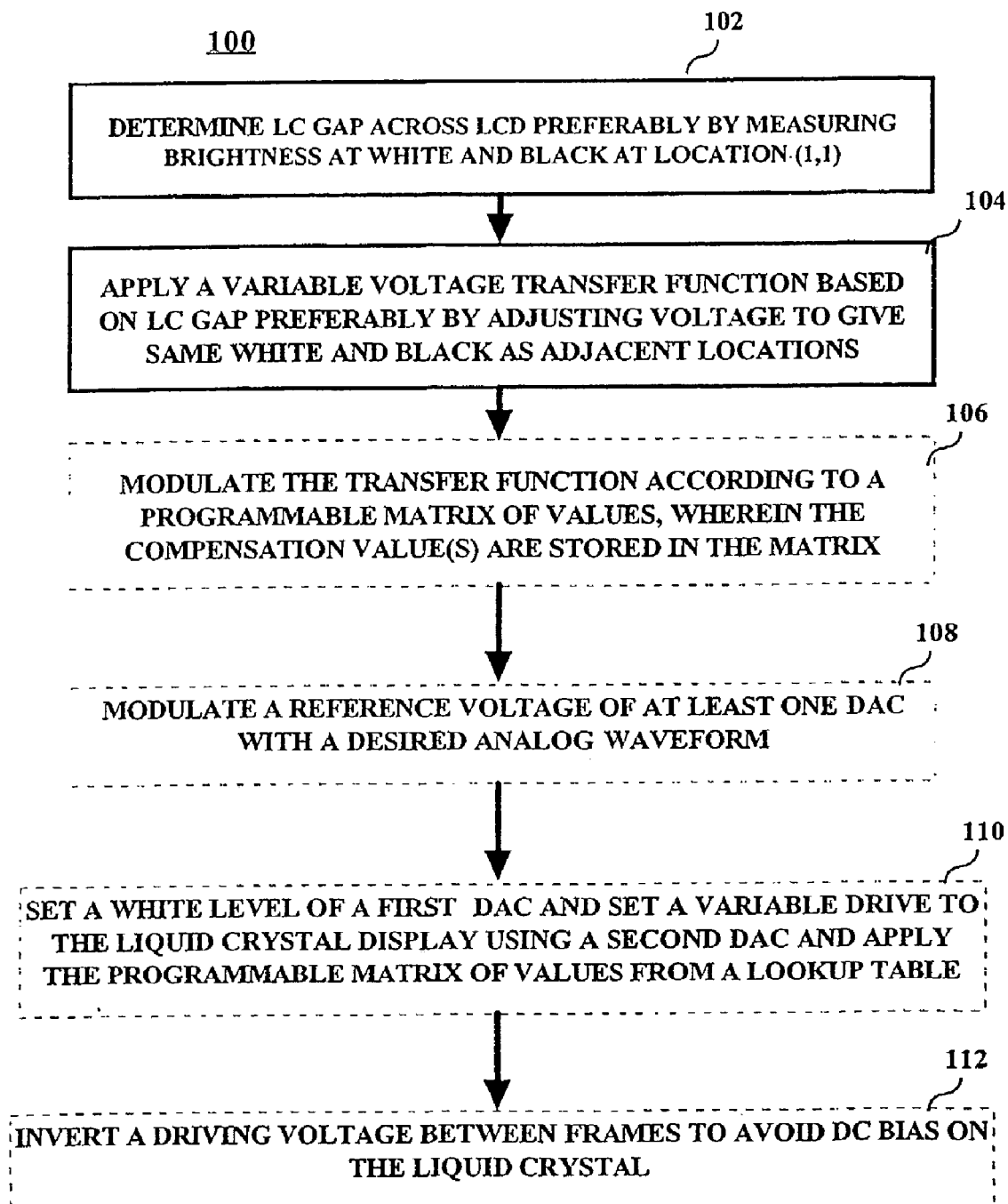

METHOD AND APPARATUS FOR UNIFORM BRIGHTNESS IN DISPLAYS

This application claims the benefit under 35 U.S.C. § 365 of International Application PCT/US01/44897, filed Nov. 29, 2001, which claims the benefit of U.S. Provisional Application 60/250,259, filed Nov. 30, 2000.

BACKGROUND OF THE INVENTION

1. Field of the Invention

This invention relates to the field of video systems utilizing a liquid crystal display (LCD) or liquid crystal on silicon (LCOS) displays, and in particular, to video systems providing brightness uniformity in LCOS/LCD displays.

2. Description of Related Art

Liquid crystal on silicon (LCOS) can be thought of as one large liquid crystal formed on a silicon wafer. The silicon wafer is divided into an incremental array of tiny plate electrodes. A tiny incremental region of the liquid crystal is influenced by the electric field generated by each tiny plate and the common plate. Each such tiny plate and corresponding liquid crystal region are together referred to as a cell of the imager. Each cell corresponds to an individually controllable pixel. A common plate electrode is disposed on the other side of the liquid crystal. Each cell, or pixel, remains lighted with the same intensity until the input signal is changed, thus acting as a sample and hold. Each set of common and variable plate electrodes forms an imager. One imager is provided for each color, in this case, one imager each for red, green and blue.

It is typical to drive the imager of an LCOS display with a frame-doubled signal to avoid 30 Hz flicker, by sending first a normal frame in which the voltage at the electrodes associated with each cell is positive with respect to the voltage at the common electrode (positive picture) and then an inverted frame in which the voltage at the electrodes associated with each cell is negative with respect to the voltage at the common electrode (negative picture) in response to a given input picture. The generation of positive and negative pictures ensures that each pixel will be written with a positive electric field followed by a negative electric field. The resulting drive field has a zero DC component, which is necessary to avoid the image sticking, and ultimately, permanent degradation of the imager. It has been determined that the human eye responds to the average value of the brightness of the pixels produced by these positive and negative pictures.

The drive voltages are supplied to plate electrodes on each side of the LCOS array.

The present state of the art in LCOS requires the adjustment of the common-mode electrode voltage, denoted $V_{ITO}$, to be precisely between the positive and negative field drive for the LCOS. The subscript ITO refers to the material indium tin oxide. The average balance is necessary in order to minimize flicker, as well as to prevent a phenomenon known as image sticking.

In the current art, the LCOS is driven with a constant voltage transfer function, irrespective of the location on the display panel. Due to variations in the LC gap dimension, this produces reduced contrast and uniformity problems as the gap changes from one location to another. In order to solve this problem, various approaches have been tried to keep the cell gap distance constant. These include spacers, more compliant glass, and attempts to make the silicon back plane flatter by fastening it to a more rigid substrate. This unnecessarily adds cost to the overall device. Thus, a need exists to overcome these defects and provide a means for greater tolerance for gap variations.

BRIEF SUMMARY OF THE INVENTION

In a first aspect of the present invention, a method for obtaining uniform brightness in a display comprises the steps of determining a liquid crystal (LC) gap dimension across a liquid crystal display and applying a variable voltage transfer function to a display driver based on the LC gap dimension.

In a second aspect of the present invention, an analog display driver comprises a matrix array of flatness correction values used to compensate for variations in liquid crystal gap dimensions and at least a digital-to-analog converter (DAC), wherein a variable voltage transfer function is applied to the DAC in accordance with the flatness correction values.

In a third aspect of the present invention, a digital display driver comprises a matrix array of flatness correction values used to compensate for variations in liquid crystal gap dimensions and a digital signal processor for applying a variable voltage transfer function utilizing the matrix array.

In a fourth aspect of the present invention, a liquid crystal display having variations in liquid crystal gap dimensions comprises a display driver and at least one imager. The display driver comprises a matrix array of flatness correction values used to compensate for the variations in liquid crystal gap dimensions and has a variable voltage transfer function applied to the driver.

BRIEF DESCRIPTION OF THE DRAWINGS

FIG. 5 is a flow chart illustrating a method for uniform brightness in a display in accordance with the present invention.

DETAILED DESCRIPTION OF THE PREFERRED EMBODIMENTS

Figure 1:
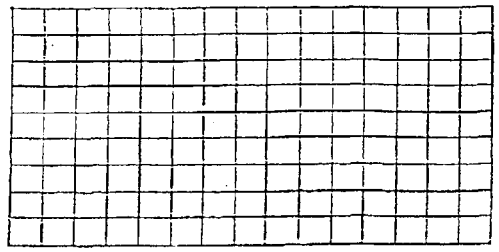
FIG. 1 is an illustration of a matrix array for flatness correction in accordance with the present invention.

An aspect of the invention overcomes the susceptibility to gap variation by modulating the transfer function according with a programmable matrix of values. The matrix represents a 2-dimensional grid 10 mapped onto the surface of the device, as shown in FIG. 1. So long as the gap variation is preferably a smooth, continuous function, whose spatial frequency does not exceed the Nyquist criterion for the sample grid, compensation of the surface variation can be achieved.

Figure 2:
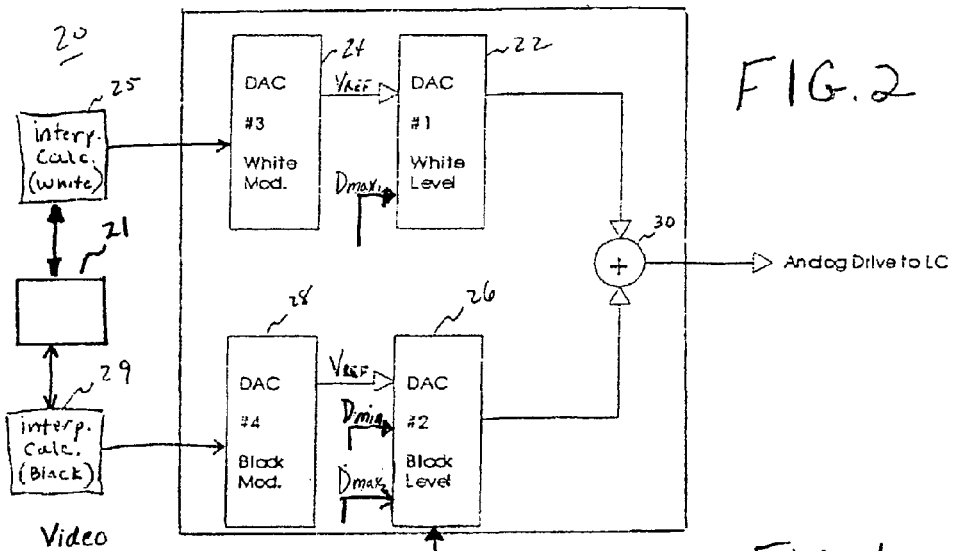
FIG. 2 is a block diagram of a portion of display driver in accordance with the present invention.

The modulation can be accomplished in different ways. In the case of analog drive to the imager, this can be accomplished using a multiplying DAC whose reference voltage is then modulated with the desired analog waveform. This can be done using one or more DAC's, depending on the system architecture. The two DAC approach, while more expensive, would likely produce the best results. A rough block diagram of the system is shown in FIG. 2. The Digicon III STV2050 could easily generate up to a 16×16 point matrix arbitrary waveform that would be suitable for this task.

Figure 3:
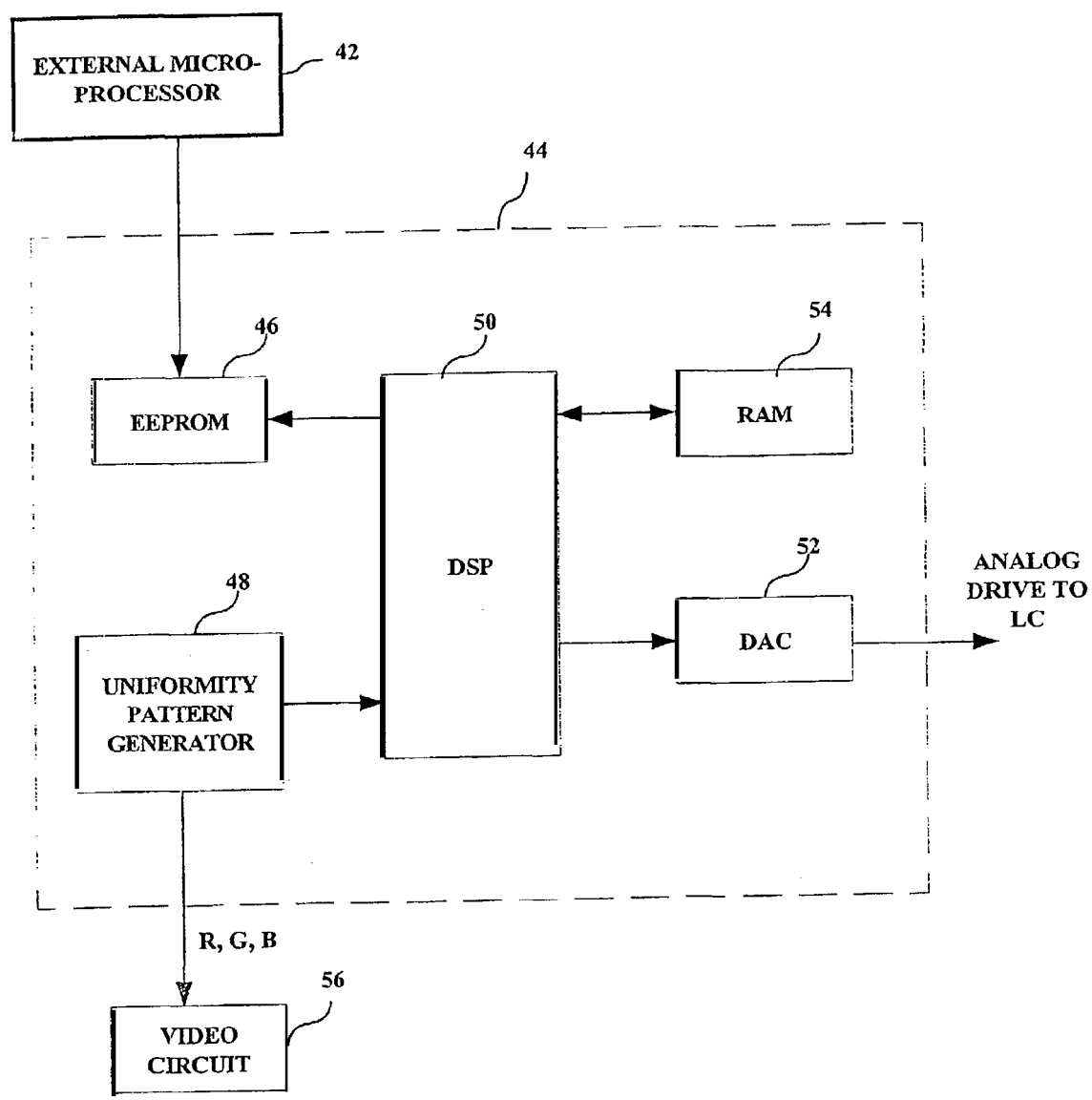
FIG. 3 is a block diagram of a portion of another display driver in accordance with the present invention.

The same function can be done in the digital domain as well. The arithmetic processor of the Digicon III would merely need to be embedded in the front-end, and the corrections applied as a multiplier. Referring to FIG. 3, a digital display driver using the digital approach would preferably comprise a matrix array of flatness correction values used to compensate for variations in liquid crystal gap dimensions and a digital signal processor for applying a variable voltage transfer function utilizing the matrix array. The driver may also comprise an imager for red, an imager for green, and an imager for blue.

While the new method adds complexity (and thus cost) to the driver system, the benefit of improved performance, and higher device yield from the imagers would help to offset these additional costs.

In FIG. 1, each intersection represents a correction location to be stored in memory and used to improve the image contrast by compensating for the gap variation.

Figure 4:
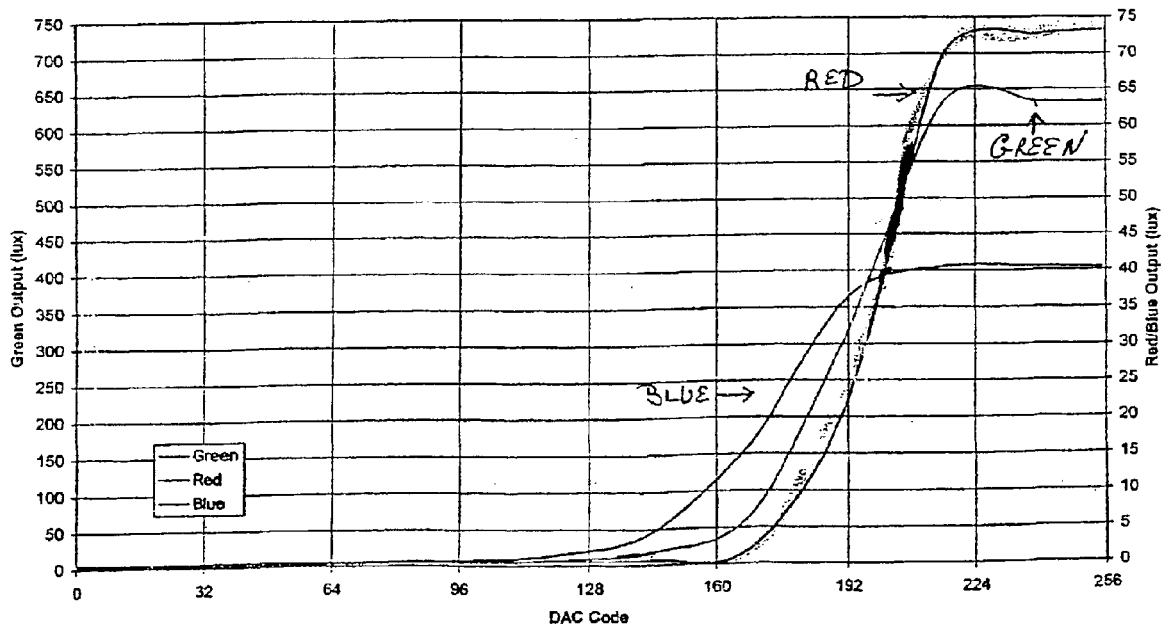
FIG. 4 is a chart illustrating a typical device transfer function in accordance with the present invention.

As is known from prior art, the transfer function of the LCD/LCOS device is a non-linear function. Much of the resolution of a single DAC system would be lost driving the device from a voltage level equal to that of the common electrode voltage (Vito) to the level at which the device begins to transition from white towards black. In addition, it is necessary to invert the driving voltage between frames to avoid DC bias on the LC, and the resulting damage. With reference to FIGS. 2 and 4, the display driver 20 uses a two-point calibration as will become apparent with the following explanation. The display driver 20 with four DACs as shown in FIG. 2 preferably has a full brightness level set at DAC 22 using a maximum DAC code at a data input of the DAC 22 represented by "$Dmax_1$". When calibrating for full brightness, $Dmax_1$ could be set to DAC Code 224 for example and the a display data input of the DAC 26 could be set to $Dmax_2$ having a value of 0 for example. The result at the output of the device 30 would provide a signal representative of full brightness. In this instance, Vref (for DACs 24 and 28) could be a varying voltage in a predetermined range. For example, a setting of 5 volts corresponds to a full brightness level at a given pixel or cell location. (During normal operation of the display, Vref will vary over the predetermined range based on the values found in the Lookup Table (LUT) 21 (as may be modified by the interpolation calculators for "in-between" pixels between the corresponding pixel values in the LUT 21 corresponding to the matrix.)) The LUT 21 corrects the nonlinearity of the transfer function. Thus, when DAC 22 has an input of DAC Code 224 for $Dmax_1$, 5 volts will be the output of DAC 22 and when DAC Code 0 (represented by "$Dmax_2$") is set at DAC 26, 0 volts will be the output of DAC 26. The output of DAC 26 is "subtracted" from the output of DAC 22 via the summing device 30 to provide the 5 volt output to the analog drive of the liquid crystal corresponding to full brightness. It should be noted that only one signal is provided at any one time to DAC 26, namely, $Dmax_2$, Dmin, or the video input signal. This can be achieved using a multiplexer (not shown) for example.

When calibrating for a darkness level, the value for $Dmax_1$ in DAC 22 would remain at DAC Code 224 and the input to DAC 26 would also now be DAC Code 224 represented by "Dmin". In this example, 5 volts will be the output of DAC 22 and when DAC code 224 (represented by "Dmin") is set at DAC 26, 5 volts will also be the output of DAC 26. The output of DAC 26 is "subtracted" from the output of DAC 22 via the summing device 30 to provide a 0 volt output to the analog drive of the liquid crystal corresponding to complete darkness. It should be understood within contemplation of the present invention that other DAC values (as may become more apparent with the description of FIG. 4) could also be used to calibrate for "full brightness" or "darkness". It should also be understood that Vref could also utilize other values other than 5 volts to achieve similar functional results described above within contemplation of the present invention.

With reference to the red line of FIG. 4, a maximum brightness of about 74 lumens per square meter (or lux value 74) is achieved at approximately DAC code 224 for the color red. In order to allow for compensation, $Dmax_1$ at DAC 22 is could be set somewhat lower, for example at about DAC code 215 which would provide a maximum brightness at a lux value of 65. $Dmax_2$ at DAC 26 would preferably set at DAC code 0 representative of complete darkness, but it could also be set anywhere between DAC code 0 and DAC code 100 as reflected in FIG. 4. Dmin could also be set at DAC code 215, but it does not necessarily need to be the same value as $Dmax_1$ for DAC 22. Once the full brightness or "white level" is calibrated using $Dmax_1$ and $Dmax_2$ and a "black level" is set using $Dmax_1$ and Dmin, the output from DAC 22 is modified to account for the variation in gap distances using the output of DAC 24 (Vref) which is a variable drive voltage determined by the matrix array of flatness correction values (that can be in the form of a lookup table 21) as maybe further modified by interpolation calculator 25 which is used to interpolate for the appropriate values for pixels in-between the pixels represented by values for the matrix. Likewise, the output from DAC 26 is modified to account for the variation in gap distances using the output of DAC 28 (Vref) which is a variable drive voltage determined by the matrix array of flatness correction values (that can also be in the form of a lookup table 21) as maybe further modified by interpolation calculator 29. Thus, a video input signal illuminating a pixel on a first portion of the display represented by the matrix array having a first gap will be compensated to achieve uniform brightness (or darkness) across the entire display when the same video input signal illuminates a pixel on another portion of the display having another gap distance as represented by the matrix array.

The data used for modulation is determined by a optical alignment of the uniformity of the black and near white states of the final system. The data at each screen location is adjusted to give the most uniform flat-field response of the system, which is the desired target. This data can be interpolated and a calculation (25 and 29) based on this data can provide the necessary data to modulate the reference voltage.

Having separate black and white level DACs as shown in FIG. 2 allows for greater ease of optimization, since the transfer function is really between black and white, and not so much between black and Vito.

Referring once again to FIGS. 1 and 2, the analog display driver 20 preferably comprises a matrix array 10 of flatness correction values used to compensate for variations in liquid crystal gap dimensions and at least a digital-to-analog converter (DAC), wherein a variable voltage transfer function is applied to the DAC. The driver preferably comprises at least a first DAC 22 and a second DAC 24, wherein a white level or brightness level is set by the first DAC 22 and a variable driving voltage to the liquid crystal is set by the second DAC 24. Alternatively, the analog display driver can comprise a first pair of multiplying DACs that uses a first DAC to set a white level for the liquid crystal and uses a second DAC to set a variable drive voltage for the first DAC (of the first pair) and second pair of multiplying DACs that uses a first DAC to set a "black" or darkness level and uses a second DAC to provide the variable driving voltage to the first DAC (of the second pair).

In another aspect of the invention, a liquid crystal display having variations in liquid crystal gap dimensions comprises a display driver 20 that preferably comprises a matrix array 10 of flatness correction values used to compensate for the variations in liquid crystal gap dimensions, wherein a variable voltage transfer function is applied to the display driver as previously explained. The display also preferably comprises at least one imager for red, green, and blue, wherein the at least one imager is driven by the display driver. It should be further understood that in a three-color imager system, each color imager (red, green and blue) could have its own driver, DACs (or set of DACs), and matrix array for appropriately adjusting the brightness level in accordance with the known gap variations.

An alternate method of implementing this same functionality in the digital domain is to do all of the processing mathematically instead of by analog mixing. The drawback of this is that it requires a higher resolution in calculations. The benefit is that there are many fewer components, and there is no need for any analog mixing of signals. This avoids drift, mismatch, and other issues that are common in precision analog systems. In a digital version as shown in FIG. 3, a portion of a display unit 40 can comprise a driver 44 having a digital signal processor (DSP) 50 or other suitable processor that applies the variable voltage transfer function utilizing the matrix array 10. The data and software for applying the variable voltage transfer function and the modulation required can be stored and processed in various configurations utilizing all or parts of an external microprocessor 42, memory in the form of EEPROM 46 or RAM 54, a uniformity pattern generator 48, as well as the DSP 50. The video circuit 56 provides visual feedback for adjustment of uniformity. The output of the DAC 52 provides the variable driving voltage to the liquid crystal that is set by the output of the DSP 50.

Referring to FIG. 5, a method 100 for obtaining uniform brightness in a display preferably comprises the steps of determining (102) a liquid crystal (LC) gap dimension across a liquid crystal display preferably by measuring brightness (at white and black at location (1,1) of the LCD) and applying (104) a variable voltage transfer function to a display driver based on the LC gap dimension. The step of applying the variable voltage transfer function can preferably be done by adjusting the voltage to give the same brightness (white and black at adjacent locations). The method may further comprise the step of modulating the transfer function according to a programmable matrix of values (106) or may alternatively comprise the step of modulating a reference voltage of at least one digital-to-analog converter with a desired analog waveform (108).

The method for driving a display using DACs may also alternatively comprise the step (110) of setting a white level of a first digital-to-analog converter and setting a variable drive to the liquid crystal using a second digital-to-analog converter. This step may further comprise the step of applying the programmable matrix of values from a look up table to correct any non-linearity of the transfer function to provide a corrected transfer function before applying the corrected transfer function to the second digital-to-analog converter. The method may further comprise the step of inverting a driving voltage between frames to avoid DC bias on the liquid crystal (112).

Although the present invention has been described in conjunction with the embodiments disclosed herein, it should be understood that the foregoing description is intended to illustrate and not limit the scope of the invention as defined by the claims.

The invention claimed is:

1. A method for obtaining uniform brightness in a display, comprising the steps of:
   determining a liquid crystal (LC) gap dimension across a liquid crystal display; and
   applying a variable voltage transfer function to a display driver based on the LC gap dimension by setting a variable drive voltage of a first digital-to-analog converter according to a programmable matrix of values; and
   setting a white level of a second digital-to-analog converter.

2. The method of claim 1, wherein the step of applying the transfer function is valid as long as the LC gap dimension variation is a smooth, continuous function whose spatial frequency does not exceed a Nyquist criterion for the programmable matrix of values.

3. The method of claim 1, wherein the method further comprises the step of applying the programmable matrix of values from a look up table to correct any non-linearity of the transfer function to provide a corrected transfer function before applying the corrected transfer function to the second digital-to-analog converter.

4. The method of claim 1, wherein the method further comprises the step of inverting a driving voltage between frames to avoid DC bias on the liquid crystal.

5. A display driver for a liquid crystal display having variations in liquid crystal gap dimensions, comprising:
   a first DAC and a second DAC, wherein a white level is set by the first DAC and a variable voltage transfer function is applied to the display driver by the second DAC based upon a matrix array of flatness correction values; and
   at least one imager for red, green, and blue, wherein the at least one imager is driven by the display driver.

6. The liquid crystal display of claim 5, wherein the display driver comprises a first pair of DACs that sets a brightness and darkness level for the liquid crystal and a second pair of DACs that multiply an output signal from the first pair of DACs and further provides a variable driving voltage to the liquid crystal.

7. The liquid crystal display of claim 5, wherein the display driver further comprises a digital signal processor that applies the variable voltage transfer function utilizing the matrix array.

* * * * *